United States Patent [19]

McRight

[11] Patent Number: 4,943,127
[45] Date of Patent: Jul. 24, 1990

[54] MULTI-FACETED OPTICAL DEVICE FOR LASER SCANNER

[75] Inventor: William C. McRight, Round Rock, Tex.

[73] Assignee: Spectra-Physics, Inc., San Jose, Calif.

[21] Appl. No.: 287,095

[22] Filed: Dec. 20, 1988

[51] Int. Cl.$^5$ .............................................. G02B 26/10
[52] U.S. Cl. .................................... 350/6.8; 350/616; 350/320
[58] Field of Search ................... 350/6.8, 6.7, 6.6, 6.5, 350/609, 616, 619, 320

[56] References Cited

U.S. PATENT DOCUMENTS

| | | | |
|---|---|---|---|
| 4,021,897 | 5/1977 | Fisli | 350/616 |
| 4,277,141 | 7/1981 | Kleiber | 350/616 |
| 4,842,354 | 6/1989 | Takahashi et al. | 350/6.8 |

Primary Examiner—Bruce Y. Arnold
Assistant Examiner—Loha Ben
Attorney, Agent, or Firm—Killworth, Gottman, Hagan & Schaeff

[57] ABSTRACT

A multi-faceted optical device for use in a laser scanner wherein the optical device is rotated about a central axis for rotational movement through a repetitive cycle to reflect and sweep a laser beam through a desired optical space comprises a body member formed by thermoplastic injection molding and shaped to be rotated about a central axis and to define multiple mirror receiving faces. Mirrors are shaped to be received upon the mirror receiving faces of the body member with three raised pads being formed on each of the mirror receiving faces for locating the corresponding mirrors received thereon in a defined orientation relative to the central axis. A fast setting, preferably ultraviolet curable adhesive, is applied to the three pads and the mirrors are forced against the pads and preferably released prior to curing the adhesive by means of the application of ultraviolet light or otherwise to form the optical device.

7 Claims, 1 Drawing Sheet

U.S. Patent
Jul. 24, 1990
4,943,127
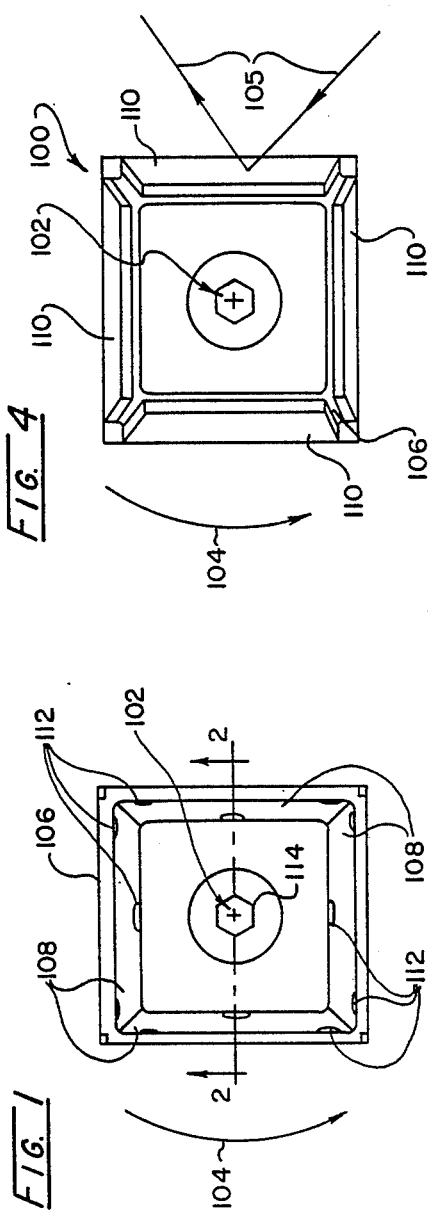
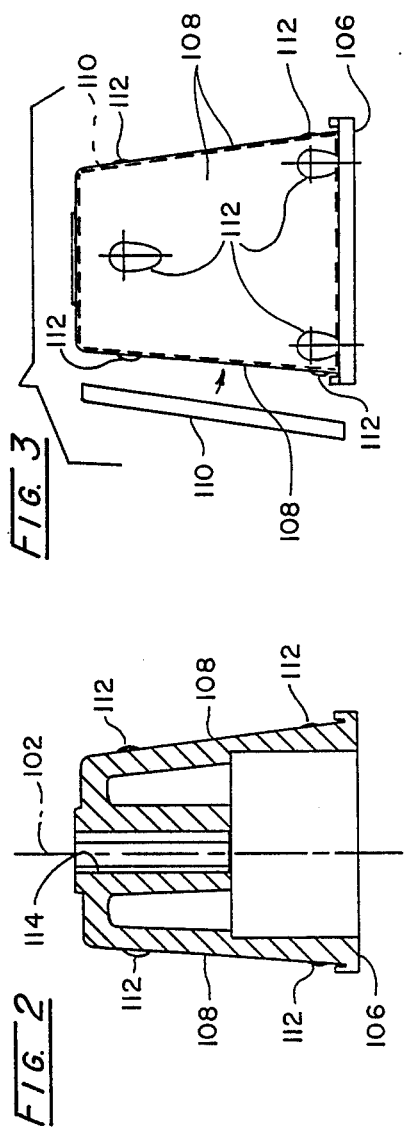

MULTI-FACETED OPTICAL DEVICE FOR LASER SCANNER

BACKGROUND OF THE INVENTION

The present invention relates generally to laser scanners and, more particularly, to an improved multi-faceted optical device for use in such scanners which device is rotated about a central axis for rotational movement through repetitive cycles to reflect and sweep a laser beam through a desired optical space and a method for making such an optical device.

Scanning equipment for sweeping a light beam across a surface is used for a wide variety of reading and imaging applications. One application which is becoming more and more common in merchandising is the bar code scanner which can perform functions ranging from reading pricing labels at point of sale terminals to performing inventory control data input functions. A common problem for all scanning equipment is the ability to accurately and repetitively control the scanning beam such that the reading or imaging application is reliably performed.

The scanning or sweeping accuracy is maintained by precision operation of a reciprocating galvanometer mirror or a multi-faceted optical device which defines two or more mirror surfaces, often formed on faces of a polygon which is rotated to perform the sweeping operation. Unfortunately, such scanning devices are expensive and add to the overall cost of scanners such that the deployment and resulting convenience and improved accuracy of scanner systems may be deferred. For example, in the prior art a multi-faceted optical device employed in many scanning systems is constructed by machining a piece of aluminum or other appropriate material.

Adding to the machining costs are the costs of attaching mirrors to the machined faces of the device. The mirrors are currently manually attached and adjusted to define desired angular orientations relative to axes of rotation of the devices. Further, the mirrors are secured by means of moisture cured silicone adhesive which requires a cure time of more than 72 hours delaying production and further adding to production costs.

Since lower cost scanning devices are continually being sought and improvements in this area can greatly advance the art and benefit users of scanning equipment, it is apparent that there is a need for an improved multi-faceted optical device which can be produced more quickly and inexpensively for use in laser scanners to accurately and reliably reflect and sweep a laser beam through a desired optical space.

SUMMARY OF THE INVENTION

This need is met by a multi-faceted optical device in accordance with the present invention and a method for making the device which includes a body member formed by plastic injection molding to reduce expense. Mirror locating pads are formed on each of two or more mirror receiving faces which are defined on the multi-faceted optical device to accurately position corresponding mirrors on the faces and thereby ensure reliable and accurate operation of a laser scanner utilizing the device. By securing the mirrors to the body member with ultraviolet curable adhesive which can be cured in less than 1 minute, the multi-faceted devices can be quickly produced to further reduce their expense.

In accordance with one aspect of the present invention, a multi-faceted optical device for use in a laser scanner wherein the optical device is rotated about a central axis for rotational movement through a repetitive cycle to reflect and sweep a laser beam through a desired optical space comprises a body member formed of plastic material and shaped to be rotated about a central axis and to define two or more mirror receiving faces. Two or more mirrors are shaped to be received upon the mirror receiving faces of the body member and pad means are formed into the mirror receiving faces for locating the two or more mirrors upon the mirror receiving faces in a defined orientation relative to the central axis. Finally, fast setting adhesive is used to secure the mirrors to the mirror receiving faces. Preferably, the body member is formed by thermoplastic injection molding and the pad means comprise three raised pads for each of the mirror receiving faces for defining three points of contact planes for the mirrors.

In accordance with another aspect of the present invention, a method for making a multi-faceted optical device for use in a laser scanner wherein the optical device is rotated about a central axis for rotational movement through a repetitive cycle to reflect and sweep a laser beam through a desired optical space comprises the steps of: forming a body member of plastic material, the body member being shaped to be rotated about a central axis and to define two or more mirror receiving faces including mirror locating pad means formed thereinto for locating two or more mirrors upon the mirror receiving faces in a defined orientation relative to the central axis; applying a fast setting adhesive to the pad means; positioning two or more mirrors shaped to be received upon the mirror receiving faces of the body member against the pad means; clamping the two or more mirrors against the pad means; and curing the adhesive to secure the mirrors to the mirror receiving faces to complete the optical device. The method may further comprise the step of unclamping the two or more mirrors prior to curing the adhesive. Preferably, the adhesive is ultraviolet curable and the curing step comprises applying ultraviolet light to the assembled device, and the pad means comprise three raised pads for each of the mirror receiving faces for defining three points of contact planes for the mirrors.

It is an object of the present invention to provide an improved multi-faceted optical device for use in a laser scanner and a method of manufacturing such a device; to provide an improved multi-faceted optical device for use in a laser scanner by thermoplastic injection molding a body member of the device; and, to provide an improved multi-faceted optical device for use in a laser scanner and a method of manufacturing such a device including a plastic body member defining two or more mirror receiving faces having mirror locating pads formed therein for locating mirrors secured thereto by ultraviolet curable adhesive.

BRIEF DESCRIPTION OF THE DRAWINGS

FIG. 1 is a top plan view of a body member for a multi-faceted optical member in accordance with the present invention;

FIG. 2 is a sectional view of the body member of FIG. 1 taken along the section line 2—2;

FIG. 3 is a side view of the body member of FIG. 1 showing a mirror to be attached thereto in accordance with the present invention; and FIG. 4 is a top view of a multi-faceted optical device constructed in accordance with the present invention.

DETAILED DESCRIPTION OF THE INVENTION

Reference is now made to the drawings which illustrate a multi-faceted optical device 100 and a method for making the optical device 100 in accordance with the present invention. The multi-faceted optical device 100 is designed for use in a laser scanner wherein the optical device 100 is rotated about a central axis 102 for rotational movement indicated by the arrow 104 through a repetitive cycle to reflect and sweep a laser beam 105 through a desired optical space.

As best shown in FIGS. 1–3, the optical device 100 comprises a body member 106 formed of plastic material, preferably by thermoplastic injection molding, to reduce expense. The body member 106 is symmetrically shaped to be rotated about its central axis 102 and to define two or more mirror receiving faces. As shown in the illustrated embodiment, four mirror receiving faces 108 are provided; however, any reasonable number of faces can be provided as required for a given application.

A corresponding number of mirrors, in this case four mirrors 110, are shaped to be received upon the mirror receiving faces 108 of the body member 106. Pad means, preferably comprising three raised pads 112, are formed on each of the mirror receiving faces 108 for defining three points of contact planes for the mirrors 110. The pads 112 are formed into the mirror receiving faces 108 for locating the mirrors 110 upon the mirror receiving faces 108 in a defined orientation relative to the central axis 102. Finally, fast setting adhesive (not shown) is applied to the pads 112 to secure the mirrors 110 to the mirror receiving faces 108.

A method for making the multi-faceted optical device 100 in accordance with the present invention comprises the steps of forming the body member 106 of plastic material with the body member 106 being shaped to be rotated about its central axis 102 and to define two or more mirror receiving faces 108. The mirror receiving faces 108 are formed to include mirror locating pads 112 therein for locating the mirrors 110 upon the mirror receiving faces 108 in a defined orientation relative to the central axis 102. A fast setting adhesive (not shown) is next applied to the pads 112. After the adhesive is applied to the pads 112, the mirrors 110 which are shaped to be received upon the mirror receiving faces 108 of the body member 106 are clamped against the pad 112. The final step of the method comprises curing the adhesive to secure the mirrors 110 to the mirror receiving faces 108 to complete the optical device. The method may further comprise the step of unclamping the mirrors 110 prior to curing the adhesive. Preferably, the adhesive is ultraviolet curable and the curing step comprises applying ultraviolet light to the assembled device.

As shown in the illustrated embodiment of the present invention, the optical device 100 is coupled to a rotating drive motor (not shown) by means of a hexagonal channel 114. Of course alternate coupling arrangements can be used and are contemplated for use in the invention.

Having thus described the multi-faceted optical device in accordance with the present invention and the method of making the device in detail and by reference to preferred embodiments thereof, it will be apparent that modifications and variations are possible without departing from the scope of the invention defined in the appended claims.

What is claimed is:

1. A multi-faceted optical device for use in a laser scanner wherein the optical device is rotated about a central axis for rotational movement through a repetitive cycle to reflect and sweep a laser beam through a desired optical space, said multi-faceted optical device comprising:

a body member formed of plastic material, said body member being shaped to be rotated about said central axis and to define two or more mirror receiving faces;

two or more mirrors shaped to be received upon said mirror receiving faces of said body member;

pad means formed into said mirror receiving faces for locating said two or more mirrors upon said mirror receiving faces in a defined orientation relative to said central axis; and fast setting adhesive securing said mirrors to said mirror receiving faces.

2. A multi-faceted optical device for use in a laser scanner as claimed in claim 1, wherein said body member is formed by thermoplastic injection molding.

3. A multi-faceted optical device for use in a laser scanner as claimed in claim 1, wherein said pad means comprise three raised pads for each of said mirror receiving faces for defining three points of contact planes for said mirrors.

4. A method for making a multi-faceted optical device for use in a laser scanner wherein the optical device is rotated about a central axis for rotational movement through a repetitive cycle to reflect and sweep a laser beam through a desired optical space, said method comprising the steps of:

forming a body member of plastic material, said body member being shaped to be rotated about said central axis and to define two or more mirror receiving faces including mirror locating pad means formed thereinto for locating two or more mirrors upon said mirror receiving faces in a defined orientation relative to said central axis;

applying a fast setting adhesive to said pad means;

positioning said two or more mirrors shaped to be received upon said mirror receiving faces of said body member against said pad means;

clamping said two or more mirrors against said pad means; and curing said adhesive to secure said mirrors to said mirror receiving faces to complete said optical device.

5. A method for making a multi-faceted optical device for use in a laser scanner as claimed in claim 4, further comprising the step of unclamping said two or more mirrors prior to curing said adhesive.

6. A method for making a multi-faceted optical device for use in a laser scanner as claimed in claim 5, wherein said adhesive is ultraviolet curable and said curing step comprises applying ultraviolet light to said device.

7. A method for making a multi-faceted optical device for use in a laser scanner as claimed in claim 6, wherein said pad means comprise three raised pads for each of said mirror receiving faces for defining three points of contact planes for said mirrors.

* * * * *